Dec. 28, 1943.   S. SANDELIN, JR   2,337,727
LATHE CENTER FOR WOOD PATTERNS
Filed Dec. 22, 1941
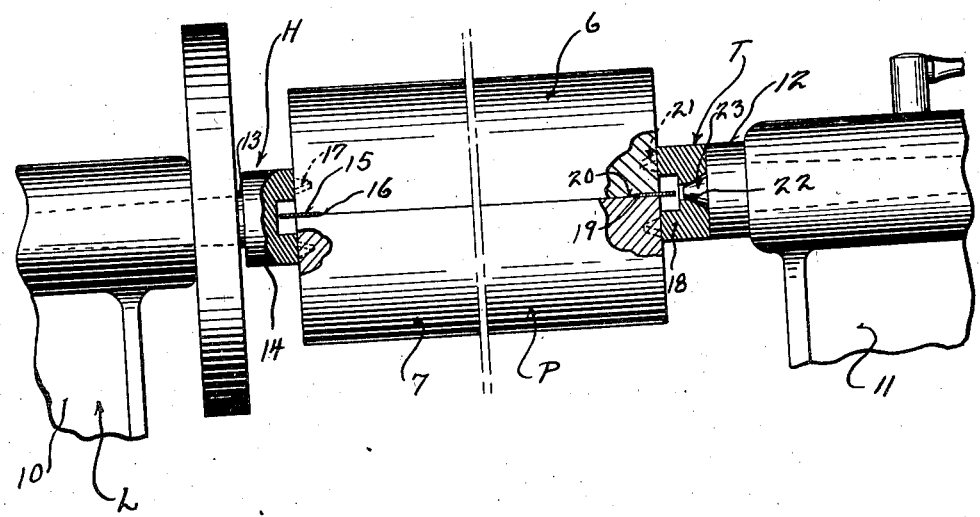
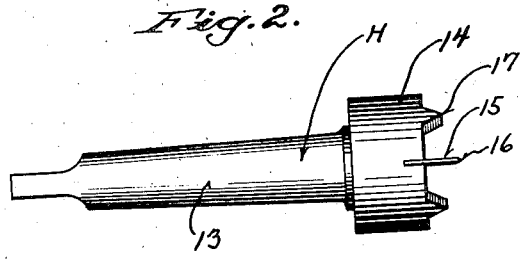
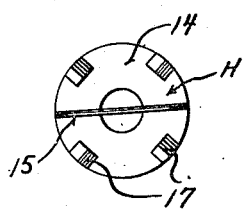
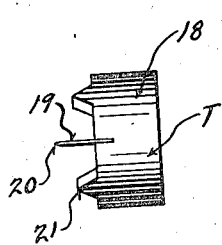
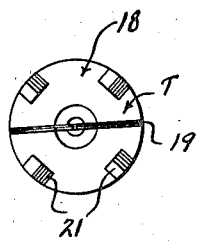
INVENTOR
SVEN SANDELIN JR.
BY
ATTORNEYS Patented Dec. 28, 1943

2,337,727

UNITED STATES PATENT OFFICE 2,337,727

LATHE CENTER FOR WOOD PATTERNS

Sven Sandelin, Jr., Racine, Wis.

Application December 22, 1941, Serial No. 423,980

6 Claims. (Cl. 142—53)

This invention appertains to lathes, and more particularly to a novel centering device for patterns during the turning thereof.

In turning wood patterns on lathes, difficulty is experienced in accurately centering the pattern on the lathe, and much time is required for this operation.

One of the primary objects of my invention is to provide novel means for facilitating the centering of the pattern on the lathe, whereby such operation can be accurately accomplished with the expenditure of a minimum amount of time and calculation on the part of the operator.

Wood patterns are made in companion half-sections, and these half-sections are detachably secured together during turning. My centering device makes use of the fact that the patterns are made in companion half-sections.

Another salient object of my invention is the provision of novel lathe centers having diametrically extending thin centering blades thereon for reception between the companion half-sections of the patterns, whereby to facilitate the accurate association of the pattern with said centers.

A further important object of my invention is to provide a novel lathe head stock center having a diametrically extending thin blade for insertion between the companion half-sections of a pattern and driving spurs around the blade for engaging in said pattern.

A still further important object of my invention is to provide an attachment for the tail stock center embodying a collar for engaging over said center carrying a diametrically extending thin blade for insertion between the pattern sections and spurs for engaging in the pattern.

With these and other objects in view, the invention consists in the novel construction, arrangement, and formation of parts, as will be hereinafter more specifically described, claimed, and illustrated in the accompanying drawing, in which drawing:

Figure 1 is a fragmentary side elevational view showing my novel centering device for holding a pattern on a lathe.

Figure 2 is a detail, side, elevational view showing the head stock center.

Figure 3 is an end elevational view of my novel head stock center.

Figure 4 is a side elevational view of the attachment for the tail stock center.

Figure 5 is a front elevational view of the same.

Referring to the drawing in detail, wherein similar reference characters designate corresponding parts throughout the several views, the letter L generally indicates a lathe, and P a wood pattern adapted to be held on the lathe by my novel head stock center H and tail stock centering attachment T.

Only a fragment of the lathe L has been shown, as the lathe itself forms no part of the present invention. As shown, the lathe L includes the head stock 10 and the tail stock 11. The center 12 for the tail stock can be of ordinary construction and can be held in place in the usual manner.

My novel head stock center H includes a shank 13, and this shank corresponds to the ordinary head stock center and can be secured to the head stock spindle by a suitable chuck or in the ordinary way. The forward end of the shank 13 has formed thereon a head 14, which can take a cylindrical shape. Extending diametrically across the head is a thin centering blade 15, and the forward end of this blade can be sharpened, as at 16, if such should be preferred. The forward end of the head 14 has formed thereon a plurality of spurs 17, which extend about the blade 16, and the purpose of the blade 16 and the spurs 17 will be later set forth.

My attachment T for the tail stock center 12 includes a collar 18, and the forward face of the collar carries a diametrically extending thin centering blade 19. The forward edge of this blade can also be sharpened, as at 20, if preferred. Formed on the forward face of the collar 18 is a plurality of spurs 21, and these spurs extend about the blade. The inner or rear face of the collar 18 has formed therein a tapered opening 22, which is adapted to snugly receive the centering point 23 on the tail stock center 12, as can be clearly seen by referring to Figure 1.

As stated, my centering devices are adapted to be particularly used in the turning of wood patterns P. As in the usual practice, the patterns P are made in companion half-sections 6 and 7. These half-sections are detachably secured together in any preferred manner, such as by screws (not shown).

With my centering devices, the pattern can be accurately placed on the lathe with the expenditure of a minimum amount of time and calculation, in that the centering blades 15 and 19 of the head stock center H and the tail stock attachment T can be forced in between the companion half-sections 6 and 7 of the pattern P. This quickly locates one position of the centers, and, obviously, my centering devices can be quickly set to the exact longitudinal center of the pattern.

The spurs 17 constitute driving members for the pattern, and, hence, all strain is taken off the thin blade 15. Likewise, the spurs 21 of the tail stock attachment T also engage in the pattern and relieve the blade 19 from all strain. The blades 15 and 19 extend beyond the spurs 17 and 21, and, consequently, the forward ends of the blades can be inserted between the pattern half-sections before the spurs engage said pattern. By sharpening the forward ends of the blades 15 and 19, the insertion thereof between the pattern half-sections 6 and 7 is facilitated.

Changes in details may be made without departing from the spirit or the scope of my invention, but what I claim as new is:

1. A centering attachment for tail stock centers of lathes comprising, a collar having a diametrically extending centering blade on its front end, and spurs on said front end around the blade, the lower end of said collar having a centrally disposed tapered socket for receiving the centering point of the tail stock center.

2. In an attachment for facilitating the centering of sectional patterns on lathes, a centering member having a diametrically extending thin blade for insertion between the half sections of a pattern, and spurs for engaging in the sections of the pattern.

3. In an attachment for facilitating the centering of wood patterns on a lathe, a centering member having a diametrically extending thin blade for insertion between the half sections of a pattern, and spurs for engaging in the sections of said pattern, the blade extending beyond the spurs.

4. In an attachment for facilitating the centering of wood patterns on a lathe, a centering member having a diametrically extending thin blade for insertion between the half sections of a pattern and spurs for engaging in the half sections, the forward edge of said blade being sharpened to facilitate the insertion of said blade between the pattern half sections.

5. A center for facilitating the centering of wood patterns on lathes comprising a shank, a head on the forward end of the shank having a smooth work engaging face, a diametrically extending thin blade on the head extending forwardly of the face, and driving spurs on said face.

6. A center for facilitating the centering of wood patterns on lathes comprising a shank, a head on the forward end of the shank having a smooth work engaging face, a diametrically extending thin blade on the head extending forwardly of the face, and driving spurs on the face on opposite sides of the blade adjacent to the periphery of the head, said blade extending forwardly of the spurs and having its front edge sharpened.

SVEN SANDELIN, Jr.